United States Patent
Gorden et al.

[15] 3,686,523
[45] Aug. 22, 1972

[54] DYNAMOELECTRIC MACHINE APPARATUS, SUCH AS BRUSHLESS EXCITER FOR A. C. GENERATOR, WITH FLEXIBLE TAPE CAPACITIVE MEANS

[72] Inventors: Dale I. Gorden, North Versailles; Lee W. Smart, Monroeville, both of Pa.

[73] Assignee: Westinghouse Electric Corporation, Pittsburgh, Pa.

[22] Filed: April 21, 1971

[21] Appl. No.: 136,057

[52] U.S. Cl. .................. 310/72, 310/68, 317/260
[51] Int. Cl. ........................................... H02k 11/00
[58] Field of Search .......... 310/68, 68 D, 72; 317/260

[56] References Cited

UNITED STATES PATENTS

| | | | |
|---|---|---|---|
| 3,215,910 | 11/1965 | Schilling | 317/260 |
| 3,371,235 | 2/1968 | Hoover | 310/68 |
| 3,319,141 | 5/1967 | Cariou | 317/260 |
| 3,590,291 | 6/1971 | Spisak | 310/68 D |
| 3,239,732 | 3/1966 | Fitch | 317/260 |
| 3,509,447 | 4/1970 | Wharton | 310/68 |
| 3,412,271 | 11/1968 | Hall | 310/68 |

*Primary Examiner*—J. D. Miller
*Assistant Examiner*—R. Skudy
*Attorney*—A. T. Stratton, F. P. Lyle and Gordon H. Telfer

[57] ABSTRACT

A capacitor tape is applied over the shaft of a brushless exciter and is connected to provide interphase capacitance with or without an additional resistive tape connected in series with each capacitor to provide damping resistance. The voltage suppressor functions of the capacitors can also be obtained by winding a tape to provide a distributed capacitance directly in the A.C. exciter winding. A flexible capacitive tape in accordance with this invention can be variously applied in dynamoelectric machine apparatus.

8 Claims, 9 Drawing Figures

Patented Aug. 22, 1972

WITNESSES:
Bernard R. Gieguey
James T. Young

INVENTORS
Dale I. Gorden &
Lee W. Smart.

BY
ATTORNEY

Patented Aug. 22, 1972

3,686,523

DYNAMOELECTRIC MACHINE APPARATUS, SUCH AS BRUSHLESS EXCITER FOR A. C. GENERATOR, WITH FLEXIBLE TAPE CAPACITIVE MEANS

BACKGROUND OF THE INVENTION

1. Field of the Invention

This invention relates to brushless A. C. power generating systems.

2. Description of the Prior Art

In a rotating rectifier brushless generating system, a pilot exciter and a regulator provide controlled field energization for an alternating current exciter. The rotating armature of the exciter in turn producers an alternating voltage which is applied to rotating rectifiers physically disposed with the exciter armature on a common shaft. The rectified voltage is then applied to the main generator rotating field winding which is also disposed on the common shaft. Brushless power systems are desirable because of the elimination of maintenance and replacement problems normally associated with brushes, commutators, and collector rings.

The rotating rectifier assembly usually comprises a plurality of semiconductor diodes mounted on one or more shaft supported wheels with the diodes electrically interconnected in a suitable excitation circuit between the exciter armature and the main generator rotating field windings. Capacitors are employed in such systems to suppress voltage spikes through the diodes. In the past such capacitors have been directly supported on the rectifier wheel adjacent to the diodes; Hoover U.S. Pat. No. 3,371,235, Feb. 27, 1968, is an example of that practice.

There are features about the prior art use of capacitors on rectifier wheels on which it is desirable to improve. The particular rectifier circuit, load commutating electrical characteristics, and the reverse recovery characteristics peculiar to a particular diode design are closely related. Generally, there is employed a three phase full-wave rectifier bridge circuit and the present description will be primarily directed thereto. During commutation periods in such a rectifier circuit, load current is transferred from one phase to another. In the phase going out of conduction, the load current rapidly decays approximately along a straight line at some fixed rate determined by the A.C. circuit parameters. It is inherent in the nature of silicon diodes, however, that those connected in the phase that is commutating out of conduction do not abruptly cease to conduct at zero current. On the contrary, a negative current continues to flow for a short period of time after zero current. This negative current represents phase to phase short circuit current for a time which typically varies between about 5 microseconds and 20 microseconds or more. This period of time is referred to as the reverse recovery time of the diode. The magnitude of the reverse recovery time depends strongly upon the particular diode design and varies somewhat between diodes of a given diode design. The reverse recovery time represents the time that is required for a particular diode to regain its ability to block reverse voltage. During this period of time a charge is stored, principally on the A.C. source inductance. The source inductance is the only significant inductance in the circuit. When the diode recovers its ability to block reverse voltage, the reverse current flow is rather abruptly chopped off. This results in the generation of transient voltage surges or spikes within the rectifier circuit. These voltage spikes are impressed across the diodes in the phase going out of conduction. The magnitude of these spikes can be many times that of the normal peak circuit voltages and can exceed the reverse voltage rating of the diode, frequently resulting in diode failure.

The capacitors normally connected across the diodes are a means to absorb the reverse recovery current. This reduces the commutation spike magnitude to an acceptable level. For example, a typical brushless exciter may utilize a total of 60 diodes with one capacitor for each pair of diodes. These 30 capacitors have been mounted e.g. as in the above mentioned Hoover patent, within the rotating rectifier wheels on essentially the same rotating diameter as that on which the diodes are mounted. With typical speeds of 3,600 rpm, rotational forces of 6,000 g's or more are achieved. It is thus necessary at the present time to construct the capacitor so it is capable of withstanding the very high rotational forces achieved during steady state and overspeed operating conditions. At the present time a capacitor meeting these requirements typically weighs about 4 pounds which is about eight times heavier than the diode it is designed to protect. Such a capacitor is relatively expensive and further requires a larger rectifier wheel in length and mass, so the wheel will support the capacitor and be strong enough to restrain the very large rotational forces that are due to the aggregate weight of the capacitors.

The prior art has within it a number of different types of construction for capacitors. Among these are "paper" and "film" capacitors such as are described in Standard Handbook for Electrical Engineers, Tenth Edition, McGraw-Hill Book Company, 1968, Sections 5–79 to 5–82 (pages 5–27 to 5–30).

SUMMARY OF THE INVENTION

In accordance with the present invention, the previously used design with capacitors mounted on the inner circumference of the rectifier wheel is made unnecessary. In one form the capacitors are located on the rotating shaft such as by application in the form of a tape wound around the phase conductors where they lay on the shaft. The capacitor tape is a thin flexible strip or sheet of interleaved layers of metal foil and insulating material. The tape can be wound in one or more turns, directly on top of the presently used glass banding that is for the purpose of restraining the phase conductor leads on the exciter shaft. Electrically, the capacitive tape is connected between the phase conductors. That is, a tape is wound and interconnected between conductors A and B, another tape between phase conductors B and C, and another tape between phase conductors C and A. The three capacitive tapes for three phase apparatus may be either axially displaced on the shaft or they may overlie each other. Since the inductance in the circuit can be considered as lumped at the A.C. source, it is not necessary to connect capacitors across individual diodes as has been previously practiced in order to achieve the voltage suppressor function. Such a function can be equally well achieved by the connection here disclosed wherein the capacitor tape is wound over and connected between a pair of phase conductors.

There may, additionally, be applied around the shaft, such as over the capacitor tape, a resistance tape to provide a critical damping resistance and it can be connected electrically so that one such resistance is in series with each one of the capacitors. Such a critical damping resistance will improve the diode protection.

In an alternate form of the invention, the requisite functions are provided by winding capacitive and, if desired, resistive tapes directly on the A.C. exciter winding so that such resistance and capacitance is electrically connected in parallel with the inductance of the windings. This arrangement equally well provides the necessary voltage suppressor function to protect the diodes.

While the invention is particularly described with respect to the provision of voltage suppressor capacitors in brushless exciters by a capacitive tape, it is apparent that such tape may be similarly applied in other dynamoelectric machine applications where capacitance is desired.

The capacitor tape used in the practice of this invention has some similarly to the metal foil and dielectric layers of prior art paper and film capacitors. The prior art wound such foil and dielectric layers on removable mandrels of various sizes, after which the wound structure would normally be enclosed in its own "can." The present invention, however, applies flexible capacitive materials to a structural element of dynamoelectric machine apparatus, e.g. by wrapping or winding on a support elements that is not removed from the wound component. Preferably the support element is already existing and required and the wound component is not provided with its own enclosure.

DESCRIPTION OF PREFERRED EMBODIMENTS

Figure 1:
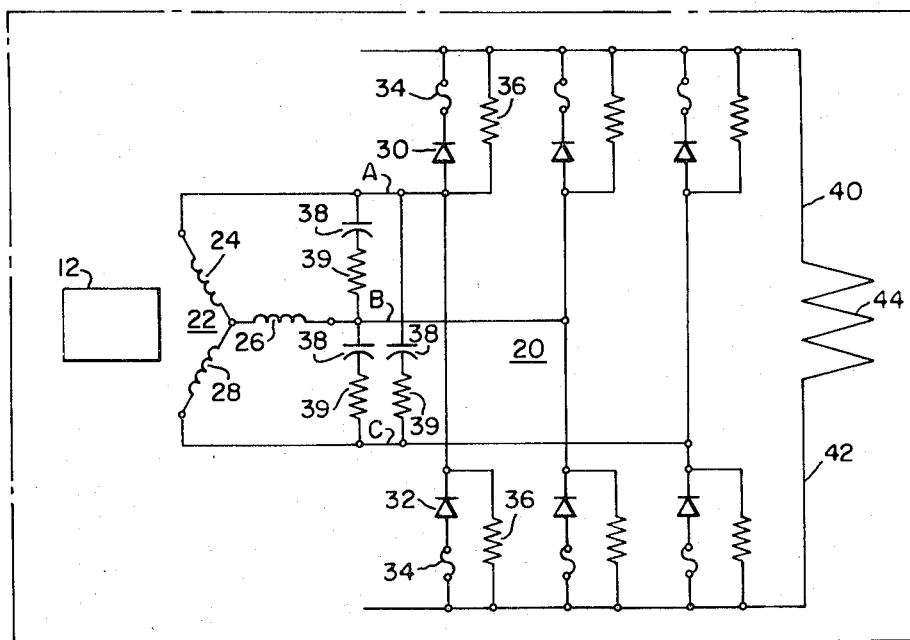
FIG. 1 is a schematic circuit diagram of a brushless exciter circuit in accordance with the present invention.

In the circuit schematic of FIG. 1 those elements that are shaft mounted and undergo rotation are shown enclosed by the dashed line 10. In this example, a permanent magnet field member 12 is electromagnetically related to a stationary armature 14 of a pilot exciter so that a pilot voltage is applied to a regulator 16 when the shaft is rotated.

The regulator 16 preferably includes rectifying means and is suitably designed to control the D.C. voltage applied to a stationary field winding 18 of the main exciter.

A main excitation circuit 20 includes a rotating armature 22 which is electromagnetically related to the field winding 18 of the main exciter and in this instance the exciter armature 22 generates three-phase A.C. voltage in respective phase windings 24, 26, and 28. The electrical output of the armature phase windings 24, 26 and 28 is transmitted in the excitation circuit portion 20 through phase conductors A, B, and C, respectively, and through a rectification circuit including forward and reverse polarity diodes 30 and 32 which have associated fuses 34 in series with each of them. (The diode circuits for each of the three phases being the same.) Each of the phase conductors A, B, and C usually comprises a plurality of individual conductors (one leading to each of the diodes) that are treated collectively in FIG. 1. Resistors 36 are connected across the diodes and fuses as in the conventional arrangement.

In accordance with this invention, a voltage suppressor capacitor 38 is provided between each of the three pairs of phase conductors AB, BC, and AC rather than being physically located adjacent individual diodes 30 and 32.

Rectified or D.C. voltages are supplied through excitation circuit conductors 40 and 42 to the field winding 44 on the rotor of the main generator. Generated power voltage appears across a stationary main generator armature winding 46. The description is merely representative of a type of arrangement in which the invention may be practiced.

A principle advantage of the arrangement of FIG. 1, as compared with that which has been previously used, such as is described in the above mentioned Hoover patent, is that the capacitors 38 are associated directly with the phase conductors A, B, and C. These phase conductors normally extend along the rotating shaft and it is one form of the invention to apply the capacitors to the phase conductors on the shaft rather than having them supported on the rectifier wheels that support diodes 30 and 32. While different types of capacitors may be used, it is advantageous to employ a flexible capacitor tape that is wrapped around the shaft with electrical connection made at desired points to the phase conductors.

Figure 2:
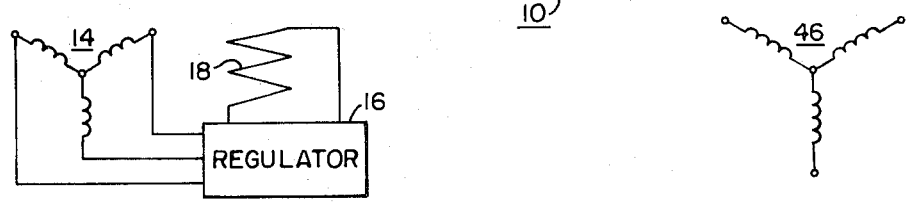
FIG. 2 is an elevation view, partly in section, of brushless exciter apparatus in accordance with the circuit of FIG. 1.
Figure 2:
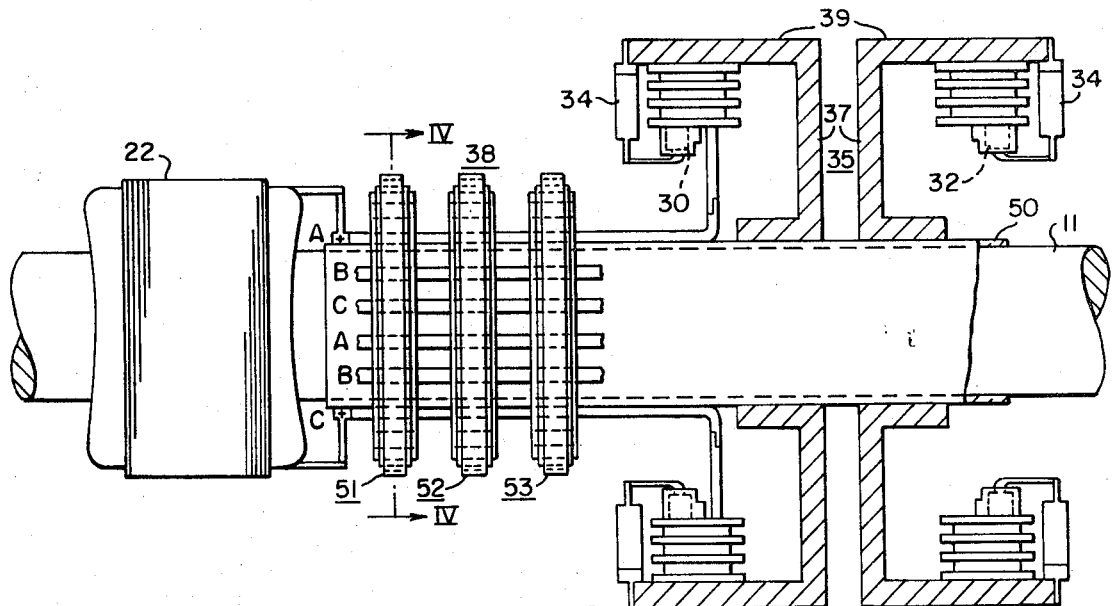

Referring to FIG. 2, a shaft 11 is shown with the armature 22 of the exciter on it. Representative ones of the plurality of phase conductors A, B, and C are shown extending along the shaft 11 between the armature 22 and the rectifier wheels 35. The wheels 35 include radially extending portions 37 and axially extending rims 39 on the inner surface of which are supported the diodes 30 and 32 and their associated fuses 34. As is normally preferred the diodes 30 and 32 are mounted on heat sinks attached to the rims 39. The semiconductor diodes and their packages are provided in a molded enclosure in this representative embodiment for a more effective support. A layer 50 of insulating material is provided on the shaft 11 between the shaft and the conductive elements supported thereon.

Figure 3:
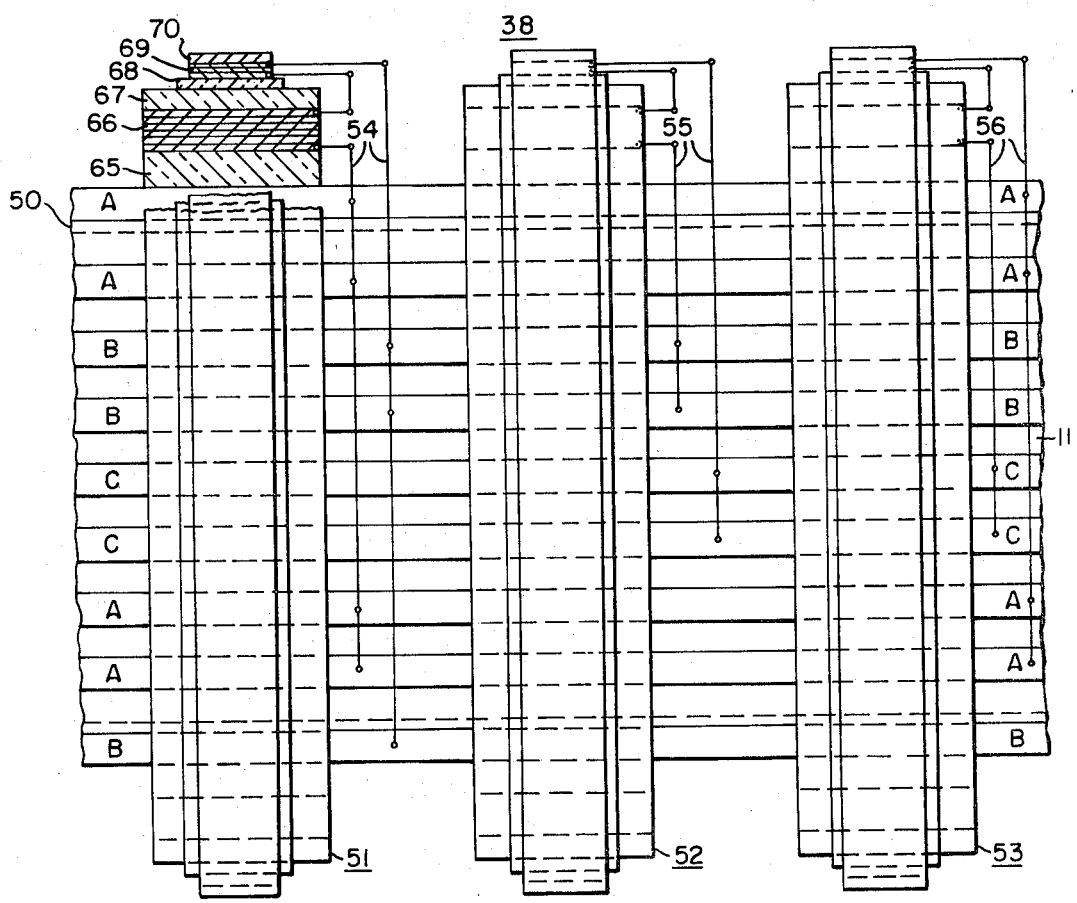
FIG. 3 is an enlarged view of part of the apparatus of FIG. 2.
Figure 4:
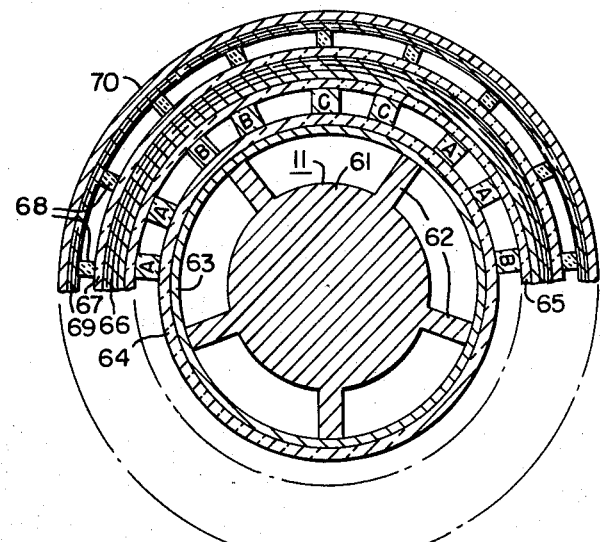
FIG. 4 is an enlarged sectional view taken along the line IV—IV of FIG. 2.

A capacitor tape is wrapped in three locations to form three bands 51, 52, and 53 around the shaft 11 over the phase conductors A, B, and C, only segments of which are shown. FIGS. 3 and 4 show this portion in greater detail. An advantage of this type of capacitor arrangement is that the axially extending flange portions 39 of the wheels 35 on which the diodes and fuses are mounted may now be shorter, and hence less massive, because the need for providing mounting room for the capacitors is avoided.

Figure 8:
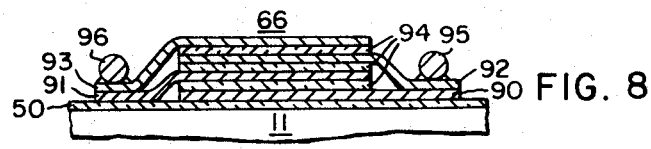
FIG. 8 is a sectional view of part of the apparatus of FIGS. 2 and 3.

The nature of the capacitor tape is that of one or more foil-like conductors interleaved with insulating films. FIG. 8 illustrates a capacitor tape 66 (as may be used in bands 51, 52 or 53) on a support or substrate which may be shaft 11 with layer 50 thereon. In the illustration, there are four layers 90, 91, 92, and 93 of metal foil between adjacent ones of which there is a layer 94 of dielectric film, thus including a total of three such layers 94.

The dimensions, materials, and number of layers of the wound tape, may be varied considerably within the practice of this invention. It is of course necessary that it be flexible to permit wrapping. Preferably, the layers 90 through 94 are thin enough and the material of foils 90 through 93 flexible enough that layers 90 and 92, that extend to the right of dielectric films 94, lay together on the substrate surface and layers 91 and 93, that extend to the left, also lay together. The respective pairs of layers 90–92 and 91–93 can be pressed together for good electrical contact therebetween and leads or conductors 95 and 96, respectively, joined thereto and thence to the appropriate phase conductors. This permits a secure structure, even though rotating at high speed. In FIG. 8, of course, the thickness elemension of the layers 90 through 94 is greatly exaggerated. Further details on a suitable tape structure will be discussed hereinafter.

In FIG. 3, the tape is wrapped around the shaft 11 at three locations with a first band 51 provided with connections 54 between phases A and B, a second band of tape 52 is provided with connections 55 to phase conductors for phases B and C and a third band of tape 53 is provided with connections 56 to conductors for phases C and A to form the equivalent circuit shown in FIG. 1. The connections 54, 55, and 56 are schematic illustrations of firmly affixed conductors such as 95 and 96 of FIG. 8.

It is convenient also in the embodiment of FIGS. 1 to 4 to provide a resistive tape electrically connected in series with the capacitive tape so that the additional resistors 39 shown in FIG. 1, which have the purpose of providing a critical damping resistance, may be included. Such damping resistances are not always necessary but the present invention facilitates their use.

When a resistive tape is used, it also must be flexible and may be wrapped directly on the capacitive tape with which it is to be electrically associated, or may be laterally displaced. Successive layers of resistive tape require insulation therebetween.

Further details of the representative structure are revealed in FIG. 4. The shaft 11 may be as previously formed with a central portion 61 from which extend radial flutes 62 with air spaces between the flutes. The flutes support a non-magnetic tube 63, such as an aluminum tube, and it is on the continuous surface of the tube 63 on which the phase conductors A, B, and C and the related elements in accordance with this invention are disposed.

A layer 64 of insulating banding material e.g. glass banding tape) is provided directly on the tube 63 for insulation between the shaft 11 and the phase conductors A, B, and C. (The layer 64 may be part of layer 50 as shown in FIG. 2). On top of the phase conductors is an additional layer 65 of insulating banding material as has been previously used to restrain the copper phase leads A, B, and C against the shaft during rotation. Over this second banding layer 65 is provided a capacitor tape 66 in accordance with this invention. On top of the capacitor tape 66 is an additional insulating banding layer 67 to restrain the new capacitor tape and hold the electrical connections in place during rotation; that is, conductors (representatively shown in FIG. 3) that extend laterally from the capacitive tape 66 for connection with phase conductors can be readily covered up by the subsequent insulating banding tape 67 and held securely in place. On top of the additional insulating banding layer 67 there may be a layer that comprises spacers 68 made from some insulating high temperature material to provide a ventilation space and a high degree of electrical isolation directly to a subsequent layer 69 of resistive film for the critical damping resistance. The resistance tape 69 helps suppress commutation oscillation spikes. It may be wound in more than one layer and if so a suitable insulating layer is provided between its successive layers. Over the outside of the composite layers is provided a glass and/or metal banded layer 70 to restrain all the elements safely against the shaft.

As an example of the magnitude of improvement that can be made in practicing this invention, the capacitors required by prior art apparatus (e.g. an 1,850 kw., 500 v., 3,600 rpm. exciter) where thirty such capacitors are used, have a total weight of about 120 lbs. while the required capacitance, even with the addition of damping resistances and extra glass banding tape, can be provided by this invention in a weight of about 10 lbs. This advantage is magnified when one considers the fact the prior art capacitors were on a wheel diameter of about 30 inches while the tape wound elements can be placed on the rotating shaft having a 13 inch diameter. The centrifugal forces are thus only of the magnitude of about 3 percent of that resulting from the prior art capacitors. Additional savings are made because the rectifier wheels, and hence the shaft itself, can now be shortened a length of about 1 foot.

As was previously mentioned, the capacitive tape used in this invention can be constructed of various metal foil and dielectric film materials. Such materials are readily available. Merely as an example, copper is a suitable conductive foil material and can be obtained in suitable foil thicknesses of about 2 mils. Copper is preferred where that is the material of the phase conductors to avoid any metallurgical problems resulting from dissimilar metals, otherwise aluminum would also be suitable. The dielectric film may, for example, be a member of the class of aromatic polyimide dielectric materials as generally described in U.S. Pat. No. 3,179,630. The material available under the trademark Kapton is particularly suitable. This material is an aromatic polyimide derived from pyromellitic dianhydride and diominodiphenylether. Such a material has both high dielectric strength and good high temperature properties. A tape as required by this invention may comprise 20 copper foil elements interleaved with 19 dielectric layers. Each dielectric layer can be a plurality of films. For example, two films, each of 1 mil thick Kapton dielectric, are suitable. For such a tape structure a total area of 408 in.² will provide a capacitance of about 3 mf. as required for each of the capacitors of a typical system. This would mean a 10 inch wide tape wrapped one time around a 13 inch diameter shaft would be sufficient. Of course, the required area could also be provided by multiple turns of a tape that is less wide. The general formula relating capacitance and the physical dimensions is $C = A/1\ \epsilon s\ \epsilon o\ (N-1)$ farads Where $C$ = capacitance $(f.)$ $A$ = area (m.²)

$1$ = composite thickness of dielectric film (m.)

$N$ = number of capacitor plates $\epsilon s$ = specific dielectric constant of the dielectric (3.5 in the case of Kapton dielectric)

$\epsilon o$ = dielectric constant of free space

The resistive film may also be selected from various known materials of which Nichrome alloy is a suitable example and is readily available, among others, in foil form. Typical values for the damping resistances required in the present invention are in the range of from about 8 to 20 ohms. Where multiple turns of a resistive tape are used, the turns may be spaced by a film dielectric material such as one like that used in the capacitive tape.

Figure 9:
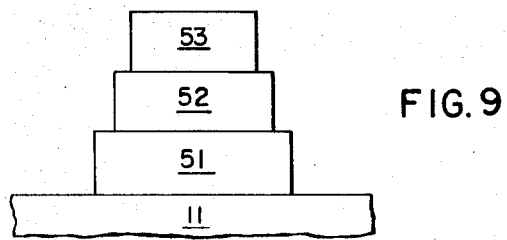
FIG. 9 is a sectional view of part of the inventive apparatus to show a further alternative form.

As a variation on the arrangement of FIG. 2 in which the three capacitive tapes 51, 52, and 53 are spaced laterally on shaft 15, the three tapes may be placed on top of each other where desired to conserve shaft space. FIG. 9 is a general illustration of such a configuration without detailing the individual layers, their interconnections, or any insulating spacers that might be necessary. To provide three equal values of capacitance, it is suitable to narrow the width of successive tapes because the winding diameter increases. Thus tapes 51, 52 and 53 are shown successively smaller in width.

Figure 5:
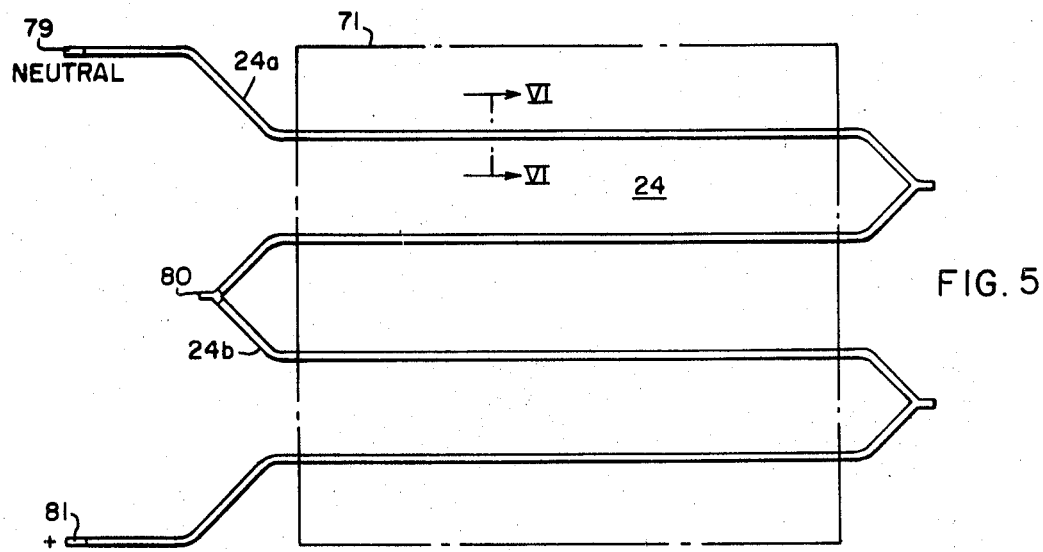
FIG. 5 is a schematic diagram of an exciter armature winding to show an alternative form of the present invention.
Figure 6:
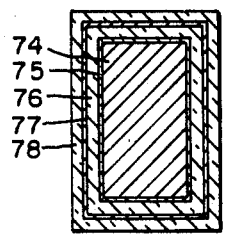
FIG. 6 is a sectional view taken along the line VI—VI of FIG. 5.
Figure 7:
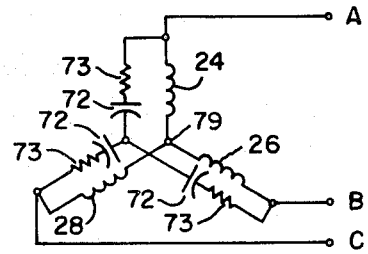
FIG. 7 is a partial circuit schematic illustrating the equivalent circuit provided by the structural arrangement of FIGS. 5 and 6 when applied to windings for each of three phases.

Reference will now be made to FIGS. 5–7 regarding a description of an alternate form of the invention. FIG. 5 schematically illustrates one phase winding 24 of an armature, such as armature 22 of FIG. 2. The closed dashed line 71 indicates the extent of the winding contained within the core of the armature. The winding conductor may be as previously formed but with additional layers of capacitive and, if desired, resistive tape to provide a capacitor 72 and resistor 73, shown in FIG. 7, in electrical parallel with the inductances of windings 24, 26, and 28. The capacitors 72, however, are not connected to the neutral point of the windings in order to avoid setting up oscillations between the capacitors and the closely adjacent inductances. The tapes are spirally wound around the conductive elements 74 with connections made to the conductors and to successive films where necessary and with insulation to avoid electrical contact where it is undesired. For example, as shown in FIG. 6, a section taken through a portion wrapped with capacitive tape, a copper strand 74 is surrounded by a ground wall 75 and has successively adjacent layers of mica or equivalent insulator 76 and the capacitive tape 77 with its associated metal and insulating film layers. Outside the capacitive layer another ground wall 78 is provided.

The winding 24 of FIG. 5 is shown with a first portion 24a with the capacitive tape 77 on it and a second portion 24b with a resistive tape on it. In this example, the first portion 24a extends from a first extremity 79 of the winding to a point 80 at which the series connection is made between the capacitive and resistive tapes. The second winding portion 24b extends from the latter point to another extremity 81 for the main phase lead connection. Since a neutral connection at extremity 79 is not desired, the capacitive tape may extend over to the adjacent winding to provide the required capacitance on it over may be conductively connected to the capacitive tapes on the adjacent winding.

The tape materials in the embodiment of FIGS. 5 to 7 may be as described in connection with the earlier embodiment with, however, the metal foil of the capacitive tape selected of a more resistive material, such as nichrome alloy. The reason for this is to avoid eddy currents due to the cross slot flux in the armature.

The embodiment of FIGS. 5–7 requires no space on the machine shaft. It also may be added to machines in the field that were not originally manufactured with voltage suppressor capacitors and may, with suitable tapes be confined to the winding end turns.

While the description has been largely confined to preferred embodiments relating to the provisions of voltage suppressor functions in brushless exciters, it is apparent that similar use may be made of the described capacitor tape in other dynamoelectric machine applications where capacitance is desired. In its more general aspects the invention applies to dynamoelectric machine apparatus with a capacitive tape wrapped or wound and mechanically secured on a structural element thereof. In its preferred and more useful forms the capacitive tape is applied to a rotating element within the machine enclosure but without any separate enclosure of its own other than means, such as banding tape, to mechanically secure it.

We claim as our invention:

1. Dynamoelectric machine apparatus comprising: a number of stationary and rotating elements including electrically conductive members, said rotating elements including a shaft supporting others of said rotating elements; a flexible capacitive tape including a plurality of interleaved metal foil and dielectric film layers, said tape being wrapped and mechanically secured on said shaft and electrically connected to at least one of said electrically conductive members.

2. The subject matter of claim 1 wherein: said machine is a polyphase A.C. machine with polyphase conductive elements including a plurality of phase windings on an armature on said shaft and a plurality of phase conductors electrically connected with said phase windings and running along said shaft; and said tape is in close physical relationship to at least some of said polyphase conductive elements and is electrically connected thereto.

3. In an excitation system for a brushless generator, the combination comprising: a shaft; a rotating armature mounted on said shaft; a rotating rectifier wheel supported on said shaft; a plurality of phase conductors extending along said shaft in insulating relationship thereto and electrically connected between said armature and said rectifier wheel; a flexible capacitive tape wrapped in intimate association with said phase conductors with selective connection between said capacitive tape and said phase conductors to provide a capacitor between each pair of phases.

4. The subject matter of claim 3 wherein: said capacitive tape encircles the phase conductors on said shaft.

5. The subject matter of claim 3 further comprising: a flexible resistive tape wrapped around said phase conductors and electrically connected in series with each said capacitive tape.

6. In an excitation system for a brushless generator, the combination comprising: a shaft; a rotating armature mounted on said shaft and having multiple phase windings therein; a capacitive tape wrapped around said phase windings with selective interconnection therebetween to provide a capacitor in parallel with the inductance of each of said windings.

7. The subject matter of claim 6 further comprising: a resistive tape wrapped around said phase windings with connection with said capacitive tape to provide a resistor in series with each said capacitor.

8. Dynamoelectric machine apparatus comprising: a number of stationary and rotating elements including electrically conductive members, said rotating elements including an armature supported on a shaft, said armature having at least one conductive winding thereon; a flexible capacitive tape including a plurality of interleaved metal foil and dielectric film layers, said tape being wrapped on and mechanically secured to said winding.

* * * * *